(12) United States Patent
Gadre

(10) Patent No.: US 7,543,271 B2
(45) Date of Patent: Jun. 2, 2009

(54) COMPILING SOURCE CODE USING GENERIC CLASSES

(75) Inventor: Makarand Gadre, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 10/657,463

(22) Filed: Sep. 8, 2003

(65) Prior Publication Data

US 2005/0055681 A1 Mar. 10, 2005

(51) Int. Cl.
G06F 9/44 (2006.01)
G06F 9/45 (2006.01)
(52) U.S. Cl. .................. 717/116; 717/114; 717/146
(58) Field of Classification Search .............. 717/114, 717/116, 146
See application file for complete search history.

(56) References Cited

U.S. PATENT DOCUMENTS

| | | | |
|---|---|---|---|
| 5,632,035 A | 5/1997 | Goodwin | |
| 6,018,628 A * | 1/2000 | Stoutamire | 717/147 |
| 6,041,180 A | 3/2000 | Perks et al. | |
| 6,063,128 A | 5/2000 | Bentley et al. | |
| 6,405,368 B1 * | 6/2002 | Freyburger | 717/140 |
| 6,760,905 B1 | 7/2004 | Hostetter et al. | |
| 6,889,373 B2 | 5/2005 | Fukase et al. | |
| 7,080,318 B2 | 7/2006 | Devillers | |
| 2004/0230958 A1 * | 11/2004 | Alaluf | 717/140 |
| 2005/0060695 A1 * | 3/2005 | Hostetter et al. | 717/153 |

FOREIGN PATENT DOCUMENTS

JP 2003044278 2/2003

OTHER PUBLICATIONS

Jonathan Lurie, Product Snapshot: J#, J# provides Hava developers a key for entering the .Net platform, published by JavaWord.com, Sep. 6, 2003, pp. 1-2.*
Eric Allen, Diagnosing Java Code: Java generics without the pain, Parts 1,2, published by IBM, May 20, 2003, pp. 1-12.*
Getov et al., High-performance parallel programming in Java: exploiting native libraries, John Wiley & Sons, Ltd, 1998, pp. 863-872.*
Allen et al., The Case for run-time types in generic Java, published : 2002, ACM International Conference Proceeding Series: vol. 25, pp. 19-23.*
Kresten Krab Thorup, Genericity in Java with virtual types, published 1997 by Springer Berlin vol. 1241/1997, pp. 1-28.*
Attardi, et al., "CodeBricks: Code Fragments as Building Blocks" Jan. 3, 2007, ACM, Jun. 2003, pp. 66-74.

(Continued)

Primary Examiner—Tuan Q Dam
Assistant Examiner—Zheng Wei
(74) Attorney, Agent, or Firm—Lee & Hayes, PLLC (57) ABSTRACT

A method includes receiving a portion of JAVA™ language software having a declaration of an instance of a generic class, parsing the declaration into a token corresponding to the generic class, and generating an intermediate language code block corresponding to the parsed declaration. The intermediate language code block is executable by a runtime engine. A system for compiling includes a parser receiving JAVA™ language source code having an instruction referencing a generic class and specifying a type of the generic class, and a code generator generating intermediate language code representing the source code.

34 Claims, 3 Drawing Sheets

OTHER PUBLICATIONS

Bracha, et al., "GJ: Extending the JAVA Programming Language with type Parameters", pp. 1-23, Mar. 1998.

"Common Intermediate Language", Jan. 9, 2007, AT <<http://en.wikipedia.org/wiki/Common_Intermediate_Language>>, Wikipedia-Definition of Common Intermediate Language (CIL), pp. 1-4.

Stork, et al., "Towards Language-Agnostic Mobile Code", Jan. 3, 2007, Elseview Science, pp. 1-12, 2001.

Kennedy, et al., "Design and Implementation of Generics for the .NET Common Language Runtime", Jun. 2001, pp. 1-12.

Syme, "ILX: Extending the .NET Common IL for Functional Language Interoperability", Sep. 2001, pp. 1-14.

Bracha, Gilad; Marx, Stefan; Odersky, Martin; "The Java Community Process(SM) Program—JSRs Java Specification Requests"; 5 pages; http://web1/jcp.org/en/jsr/detail?id=14&showPrint, printed: Sep. 8,2003.

* cited by examiner

COMPILING SOURCE CODE USING GENERIC CLASSES

CROSS-REFERENCE TO RELATED APPLICATIONS

The present application is related to co-pending U.S. patent application Ser. No. 10/657,468, entitled "Authoring and Using Generic Classes in JAVA Language Code" by Makarand Gadre and Pratap V. Lakshman; which is filed concurrently herewith, assigned to the assignee of the present application, and incorporated herein by reference for all that it teaches and discloses.

TECHNICAL FIELD

The subject matter disclosed herein relates generally to methods, devices and/or systems for compiling source code that uses generic classes.

BACKGROUND

Frameworks include class libraries that provide software developers with tools for developing, testing, using, and deploying software applications. Examples of two popular frameworks are the NET™ Framework from Microsoft® Corporation of Redmond, Wash., and the JAVA™ language framework from Sun Microsystems, Inc. of Palo Alto, Calif. Generic classes (in C++ referred to as template classes; also referred to as generic types) may be provided by such frameworks.

Generic classes refer to classes, interfaces and methods that operate uniformly on values of different types. Generic classes can speed software development by packaging classes, methods, and data and making them applicable to multiple data types that are used frequently by developers. Generic classes are useful because many common classes can be parameterized by the types of data being stored and manipulated—these are called generic class declarations. Similarly, many interfaces define contracts that can be parameterized by the types of data they handle—these are called generic interface declarations. Methods may also be parameterized by type in order to implement "generic algorithms", and these are known as 'generic methods'.

A formal specification for a software language specifies standard syntax for the language. Formal specifications for C++ and other languages set forth generic class syntaxes that specify how generic classes (or, template classes) are defined and declared; however, formal specifications for some languages, such as JAVA™ language, do not specify generic classes. Thus, generic classes that may be provided in frameworks, or other software packages, are not readily accessible by developers of JAVA™ language source code. For example, currently, JAVA™ language source code cannot use a generic class that may be provided by the .NET™ Framework. Thus, to take full advantage of a framework, developers need the capabilities for authoring, using, and compiling generic classes that may be provided by the framework.

SUMMARY

Implementations described herein provide methods and systems for compiling a generic class reference into an intermediate language executable by a runtime engine. The generic class may be referenced in source code written in a language for which use of generic classes is not formally specified.

An exemplary method includes receiving a portion of JAVA™ language software having a declaration of an instance of a generic class, parsing the declaration into a token corresponding to the generic class, and generating an intermediate language code block corresponding to the parsed declaration. The intermediate language code block is executable by a runtime engine.

An exemplary system for compiling includes a parser receiving JAVA™ language source code having an instruction referencing a generic class and specifying a type of the generic class, and a code generator generating intermediate language code representing the source code.

Additional features and advantages will be made apparent from the 11following detailed description of illustrative embodiments, which proceeds with reference to the accompanying figures.

BRIEF DESCRIPTION OF THE DRAWINGS

A more complete understanding of the various methods and arrangements described herein, and equivalents thereof, may be had by reference to the following detailed description when taken in conjunction with the accompanying drawings wherein.

DETAILED DESCRIPTION

Turning to the drawings, wherein like reference numerals refer to like elements, various methods and converters are illustrated as being implemented in a suitable computing environment. Although not required, the methods and converters will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the methods and converters may be practiced with other computer system configurations, including is hand-held devices, multi-processor systems, microprocessor based or programmable consumer electronics, network PCs, minicomputers, mainframe computers, and the like. The methods and converters may also be practiced in distributed computing environments where tasks are performed by remote processing devices that are linked through a communications network. In a distributed computing environment, program modules may be located in both local and remote memory storage devices.

Overview

Implementations described herein provide methods and systems for using generic classes in source code written in a language for which generic classes are not formally specified. Generally, source code may be developed using a framework wherein generic classes are available. For example, generic classes associated with a framework capable of using multiple source codes and an intermediate language, can be referenced in a JAVA™ language. The source code is converted into an intermediate language source code. Metadata can be generated that describes any referenced generic classes.

Thus, an implementation enables a Visual J#.NET™ (VJ#™) Compiler to work with generic classes. In this regard, an improved VJ#™ compiler include support for generic types, including data structures, information, and algorithms that are processed and executed in connection with authoring and using generic types. In one implementation, the VJ#™ compiler applies an algorithm of parsing a variable or type declaration having references to generic classes, looking up reference assemblies and validating types with respect to the generic classes, utilizing data structures representing parsed and validated generics information, and traversing a generic tree representation to generate common intermediate language code.

Exemplary Computing Environment

Figure 1:
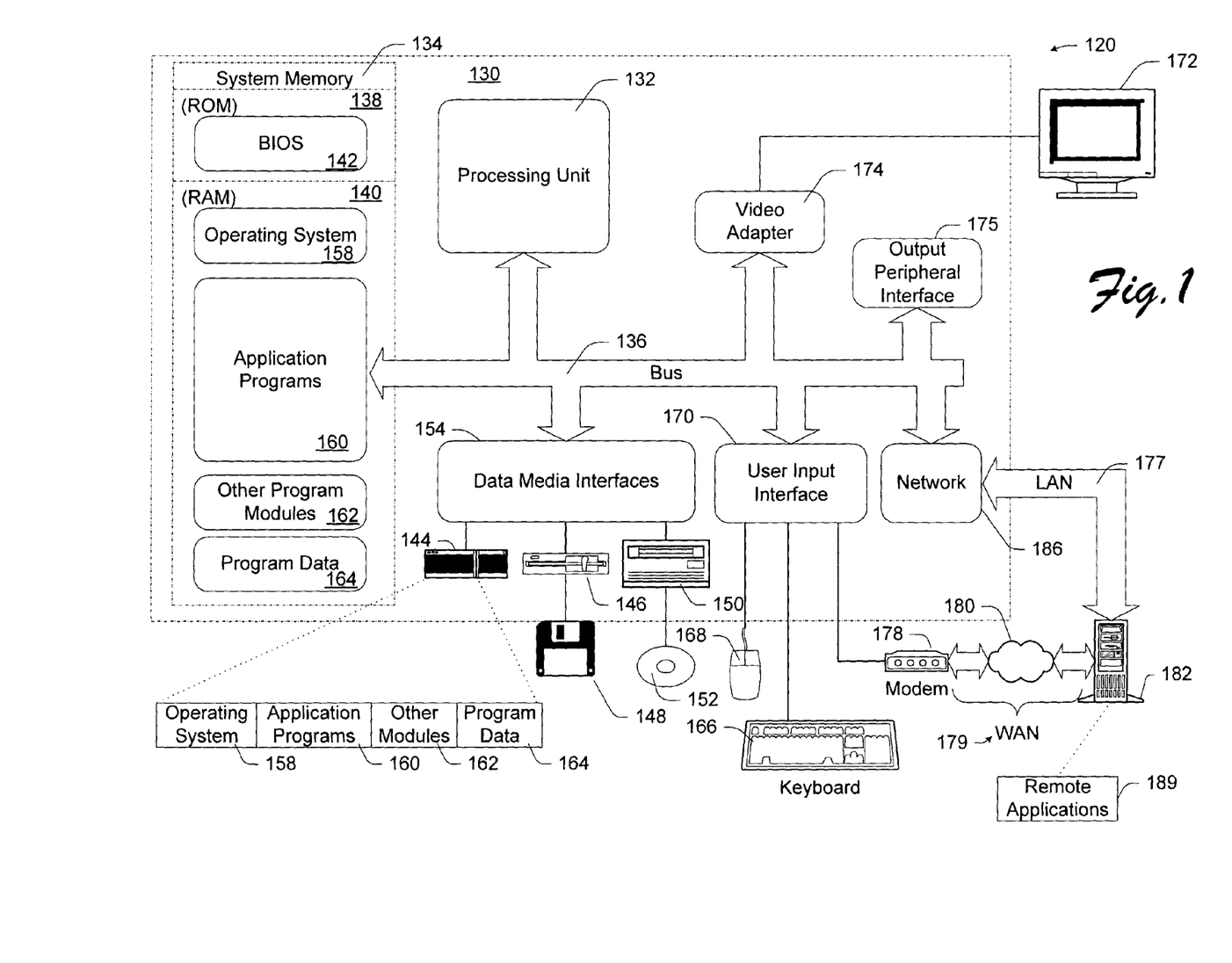
FIG. 1 is a block diagram generally illustrating an exemplary computer system on which various exemplary technologies disclosed herein may be implemented.

FIG. 1 illustrates an example of a suitable computing environment 120 with which the subsequently described exemplary methods, compilers, parsers, etc., may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Logical connections shown in FIG. 1 are a local area network (LAN) 177 and a general wide area network (WAN) 179. The LAN 177 and/or the WAN 179 can be wired networks, wireless networks, or any combination of wired or wireless networks. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Exemplary Framework for Authoring, Using, and Compiling Generic Classes

Figure 2:
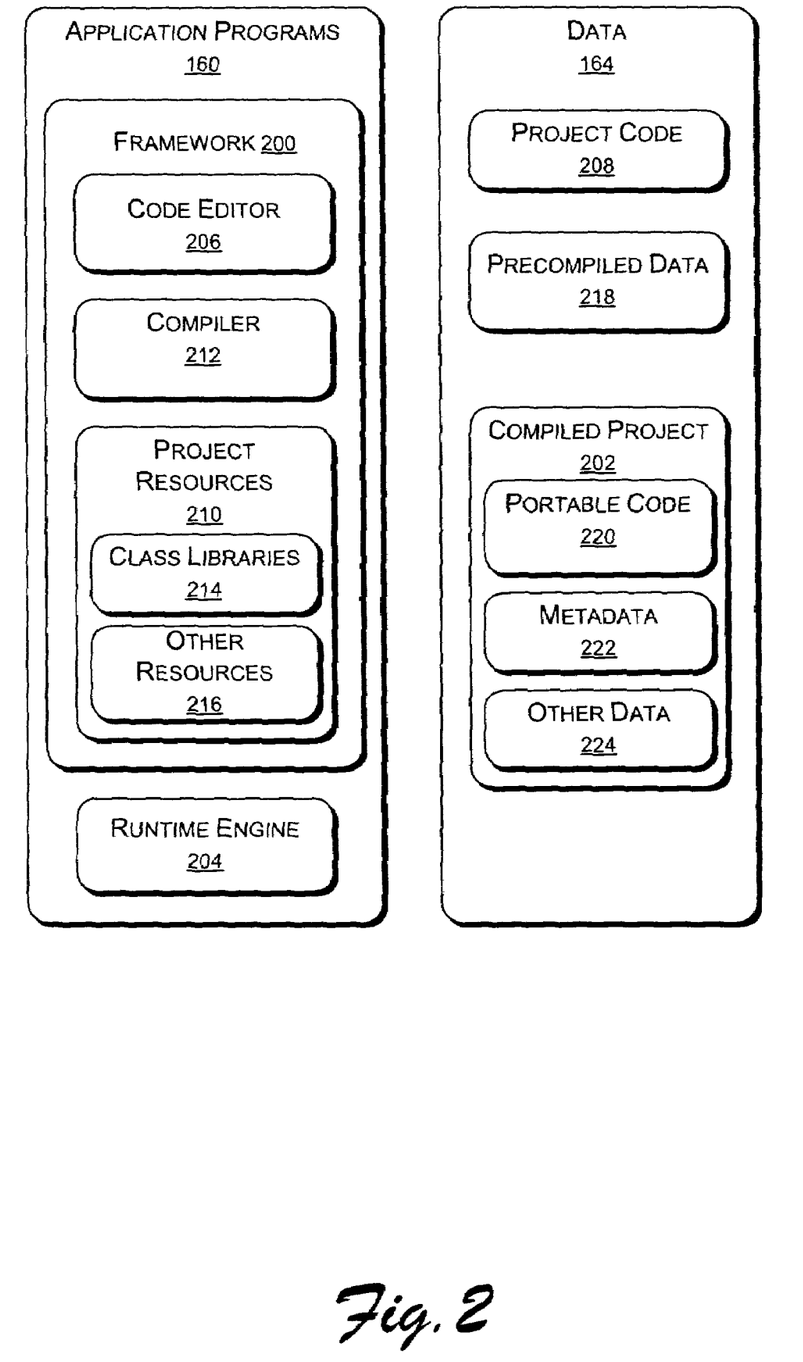
FIG. 2 is a block diagram illustrating an exemplary framework, a compiled project and a runtime engine.

FIG. 2 shows an exemplary framework 200 and a compiled project 202 targeted for execution on a runtime engine (RE) 204. In object-oriented programming, the terms "Virtual Machine" (VM) and "Runtime Engine" (RE) have recently become associated with software that executes code on a processor or a hardware platform. The RE 204 is operable to translate common intermediate language code into microprocessor-specific binary that is executable by a computer. In the description presented herein, the term "RE" includes VM. A RE is often associated with a larger system (e.g., integrated development environment, framework, etc.) that allows a programmer to develop an application.

For a programmer, the application development process usually involves selecting a framework, coding in an object-oriented programming language (OOPL) associated with that framework to produce a source code, and compiling the source code using a compiler associated with the framework. In FIG. 2, the framework 200 includes a code editor 206 for authoring (i.e., writing and/or editing) project source code 208, project resources 210 (e.g., libraries, utilities, etc.) and a compiler 212 for compiling the project source code 208. The programmer may elect to save project source code and/or project resources in a project file and/or a solution file, which may contain more than one project file. If a programmer elects to compile project code and/or project resources, then the resulting compiled code, and other information if required, is then typically made available to users, e.g., as a compiled project, a solution, an executable file, an assembly, etc.

The project resources 210 include class libraries 214 and other resources 216 (e.g., utilities, etc.). The class libraries 214 have definitions for classes that may be used and/or authored by a developer. The classes contained in class libraries 214 may have associated tokens for ease of referencing and compiling the classes. For example, each class in the class libraries 214 can have a numerical token that identifies the class.

Figure 3:
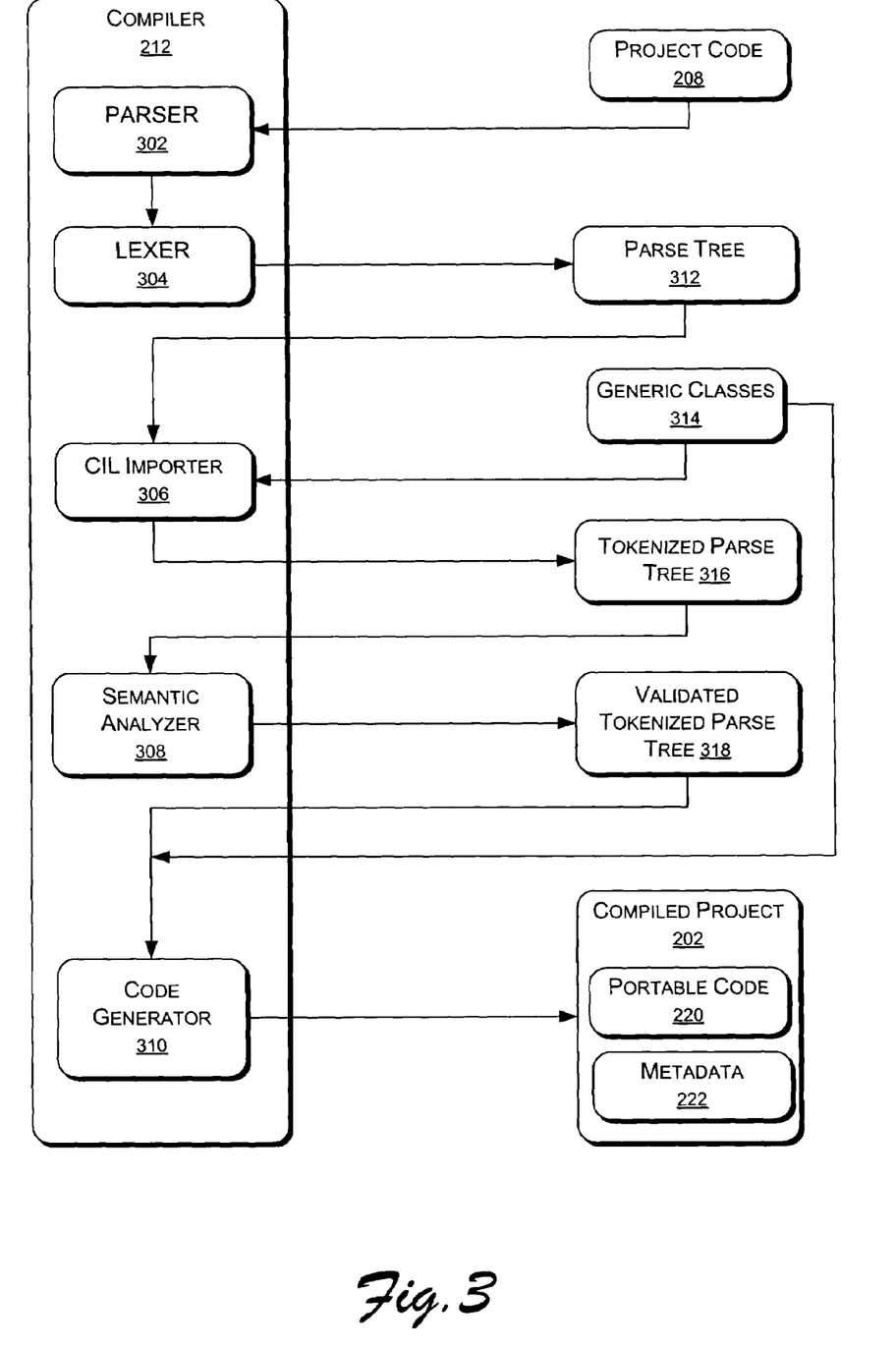
FIG. 3 is a block diagram illustrating an exemplary compiler operable to compile source code that references generic classes into project code executable by a runtime engine.

One or more of the class definitions in the class libraries 214 correspond to generic classes (also called generic types) (e.g., generic classes 314, FIG. 3). The term "generic class" refers to classes, interfaces and methods that operate uniformly on instances of different types and/or classes. By way of example, and not limitation, a "Queue<Type>" class can be a generic class, wherein "Type" may be declared as any of multiple allowable types or classes. The class library definition of a generic class defines which types are allowable for the generic class as well as the methods applicable to an instance of a generic class.

One or more standard generic classes may be provided by the framework 200. For example, a recently developed framework called the .NET™ framework (Microsoft Corporation, Redmond, Wash.) comes with a generic "Queue <Type>" class, a "Stack <Type1>" class, a "Dictionary <Type1, Type2>" class, and others. In addition, implementations of authoring methods and systems described herein enable a developer define generic classes and make them available in the class libraries 214 for use by the project code 208.

Precompiled data 218 shown in FIG. 2 includes any data created and/or used by the compiler 212 to generate the compiled project 202. As is discussed in further detail below, precompiled data 212 may include a parse tree 312 (FIG. 3), a tokenized parse tree 316 (FIG. 3), and a validated tokenized parse tree 318 (FIG. 3). Precompiled data includes various data structures and other information that are intermediate between the source code 208 and the compiled project 202. FIG. 3 describes exemplary data and information in the precompiled data 218 and how the compiler 212 uses the precompiled data to create the compiled project 202.

FIG. 2 shows a compiled project 202 generated by the compiler 212, which includes portable code 220, metadata 222, and other data 224 (e.g., headers, native image data, custom image data, etc.) that may be necessary for proper execution of the portable code 220. The other data 224 may pertain to project resources 210 or other resources. The compiled project 202 is typically available as one or more files capable of distribution over a network. For example, the .NET™ framework can produce a compiled project as a portable executable file containing intermediate language code (IL code) and metadata, which is suitable for distribution over the Internet and execution using the .NET™ Runtime Engine (RE). In the .NET™ environment, the compiled project 214 may be referred to as an assembly. Of course, one or more separate code files and one or more separate data files may be contained within a project file or a compiled project file. Upon receipt of the requisite file or files, a user can execute an embedded application or applications on a RE associated with the selected framework. FIG. 2 shows the RE 204 associated with the framework 200.

Traditional frameworks, such as the JAVA™ language framework (Sun Microsystems, Inc., Palo Alto, Calif.), were developed initially for use with a single object-oriented programming language (OOPL) (i.e., monolithic at the programming language level); however, the .NET™ framework allows programmers to code in a variety of OOPLs (e.g., VISUAL BASIC®, C++, Visual C#.NET™, JScript, Visual J#.NET™, etc.). This multi-OOPL or multi-source code framework is centered on a single compiled intermediate language having a virtual object system (VOS).

The intermediate language (IL) generated by the .NET™ Framework is often referred to as a "language-neutral" intermediate language because the IL may be generated from software written in multiple source code languages. The compiler 212 in a .NET™ Framework compiles all source code to a common IL, irrespective of the source code language.

In contrast to the .NET™ Framework, other frameworks, such as the JAVA™ language framework, do not allow programmers to code in a variety of OOPLs. For example, the JAVA™ language framework requires that all source code be in the JAVA™ language. The JAVA™ language framework compiles the JAVA™ language source code into bytecodes, which are non-language-neutral. Thus, in the JAVA™ language framework there cannot be bytecodes generated from multiple OOPLs.

While the aforementioned .NET™ framework exhibits programming language or source code interoperability, a need exists for methods, devices and/or systems that allow authorship, use, and compilation of generic classes in a JAVA™ language project, solution, or source code. For example, a developer may want to declare a predefined generic class in source code written in the JAVA™ language, whereby the declared generic class is compiled into portable code. As further described herein, exemplary methods, devices, and/or systems can facilitate authoring, using, and compiling JAVA™ language source code in the .NET™ Framework.

Implementing Generic .NET™ Classes in a JAVA™ Language

With particular regard to the code editor 206, a user may author the project source code 204 in a number of source code languages, including JAVA™, VJ++, Visual J#.NET™, or other JAVA™ languages. As used herein, the term "JAVA™ language" refers to any source code language that is based on a formal JAVA™ language specification, such as, but not limited to, the JAVA™ Development Kit (JDK™) 1.1.4. Although formal JAVA™ specifications do not specify generic classes, exemplary implementations described herein provide ways for generic classes to be authored, used and compiled in a JAVA™ language source code.

Implementations of methods and systems described herein enable authoring generic classes in JAVA™ language source code for use by JAVA™ language and/or software programs in other languages. In particular, these implementations provide for authoring and using generic classes whereby instances of such generic classes can be compiled into a common intermediate language (CIL) and executed by a runtime engine, such as the runtime engine 204. A generic class may be authored by defining the generic class such that methods and data of the generic class are uniformly applicable to multiple different classes. In addition, such generic classes authored in JAVA™ language may be used (e.g., declared, referenced, etc.) by software programs written in other languages, such as C++ and Visual C#.NET™.

In a particular implementation, angular brackets are used in JAVA™ language source code to identify classes associated with a generic class. Between the angular brackets, at least one unconstrained type or class is specified. The following examples illustrate how a developer may author a generic class in JAVA™ language source code.

EXAMPLE 1

```
public class MyGenericClass<X>
{
    public MyGenericClass( )
    {
        // constructor
    }
    public void Set(X xvar)
    {
        // code that may change state of this class
    }
    public X ReturnResult( )
    {
        X xvar;
        // code that may change xvar
        return xvar;
    }
}
```

Example 1 illustrates a generic class definition in JAVA™ language source code in which the type argument, identified by 'X', can be of any class. The 'X' class is called an unconstrained type because it can be of any class. The generic class can be instantiated by providing a value for the type argument. In so doing, a 'constructed type' is created.

A second example of a generic class definition in JAVA™ language source code is shown in example 2 shown below

EXAMPLE 2

```
public class MyGenericClass<X implements IComparable>
{
    public MyGenericClass( )
    {
        // constructor
    }
    public void Set(X xvar)
    {
        // code that may change state of this class
    }
    public X ReturnResult( )
    {
        X xvar;
        // code that may change xvar
        return xvar;
    }
}
```

Example 2 illustrates how for certain generic classes each type-parameter may be qualified by an explicit-type-parameter-constraint. The specification of an explicit constraint is optional. If given, the constraint is a reference-type that specifies a minimal "type-bound" that every instantiation of the type parameter must support (for example, the constraint may be that the type parameter must implement a certain interface, inherit from a certain class, or provide a default constructor). In Example 2 above, the generic class can be instantiated by providing a value for the type argument, identified by 'X'; the value provided must be of a class that implements the IComparable interface.

The foregoing examples illustrate how a developer may author generic classes in the JAVA™ language using the code editor 206. Such authored generic classes can be included in the generic classes of the class libraries 214. Other generic classes and types may be provided in the class libraries 214. As discussed earlier, such generic classes, whether or not they are authored in JAVA™ language, may be used by JAVA™ language programs and/or other non-JAVA™ language programs.

In a .NET™ Framework implementation, the generic classes (i.e., types), parameters, non-generic classes, and instantiated generic classes are defined by various code sections, such as .NET Assemblies, .NET Class Libraries, and User Code. A .NET™ Assembly is a collection of classes in MSIL form (e.g., classes available in .NET™ Frameworks). Table 1 illustrates an exemplary arrangement.

TABLE 1

| Description | Defined By |
| --- | --- |
| .NET Generic Type | .NET Class Libraries, .NET Assembly |
| Formal Parameter Type to a .NET Generic Type | .NET Class Libraries, .NET Assembly |
| Type Parameter of Generic Type to be instantiated | User Code |
| Non Generic Type | .NET Class Libraries, .NET Assembly, User Code |
| Constructed Type | User Code |

Thus, a .NET Class Library and/or a .NET Assembly contain definitions of generic classes, and specify the formal parameter types/classes that can be passed to a generic class. User code, such as project code 208 and user-authored class libraries, specifies any constructed types (i.e., instantiated generic classes).

Generic classes that have been defined and stored in the class libraries 214 can be used by developers, even in source code written in languages for which the use of generic classes has not been formally specified, through implementations described herein. For example, a developer can declare, or otherwise reference, a generic class in JAVA™ language source code. In the .NET™ framework, a developer can create JAVA™ language source code using Visual J#.NET™ that includes declarations of instances of pre-defined generic classes. As is discussed in further detail below, the compiler 212 is operable to compile declared instances of generic classes into portable code 220 in languages that do not formally specify use of generic classes.

With regard to using generic classes, a developer specifies in the source code any unconstrained types or classes defined in the generic class definition. As discussed above, when source code declares an instance of a generic class with an allowable unconstrained type, the instance of the generic class is referred to as a constructed class. A constructed class is a species of the generic class. For example, if a generic class Queue, is defined as 'Queue<X>,' wherein class 'X' is unconstrained, a declaration of 'Queue<int>' is referred to as a constructed class.

A developer specifies a constructed class of the desired generic class, and then uses the constructed class much like other classes. The developer can declare an instance of the constructed class, reference the instance of the constructed class, apply operations or methods to the instance of the constructed class, and the like.

Examples of declared generic types are shown below in Table 2, in which parameter 'X' refers to an unconstrained type:

TABLE 2

| Declared Generic Type | Instantiated Type |
|---|---|
| Queue<X> | Queue <int> abc = new Queue <int>; Queue <System.String> abc = new Queue<System.String>; Queue <Queue <System.String> > = new Queue <Queue <System.String> >; |
| Lookup<int,X> | Lookup<int, Object> lu = new Lookup<int, Object>; Lookup <int, Queue<String> > = new Lookup<int, Queue<String> >; // Nested Generic Type |
| SLookup<String, X> | class STR extends String ... SLookup<String, Object> slu = new SLookup<String, Object>; SLookup<STR, Object> slu2 = new SLookup<STR, Object>; // The next line would be error because // System.IntPtr is not an instanceof(String); SLookup<System.IntPtr, Object> = new SLookup<System.IntPtr, Object>; |

Some generic classes may allow for nesting of classes. Nested classes refer to classes within classes. For example, a constructed class of the generic class 'Queue<X>' may be 'Queue<Queue<int>>,' wherein 'int' is a nested class; i.e., 'int' is nested in the inner 'Queue<>' generic class. In the foregoing example, because 'X' is unconstrained, generic classes can be nested at any number of levels. Thus, a constructed class takes the general form 'GC<GC<GC<...>>>,' where 'GC' refers to the generic class. In a .NET™ implementation, nested classes may be used in JAVA™ language source code, and source code of other languages that may not formally specify use of generic classes.

Existing JAVA™ language source code can be easily adapted to use resources, such as generic classes, which may be provided by a framework or other software development package. In a framework environment, the adapted JAVA™ language source code can be compiled for execution by a runtime engine. A developer can modify existing source code to include references to generic classes. The developer simply needs to identify a generic class that is available from the framework or other software development package, and specify the class (or classes) that are unconstrained parameters for the generic class using the proper syntax. The developer creates a constructed class by declaring a generic class specifying the unconstrained class (or classes) to be used. An instance of the constructed class can then be declared and used.

For example, a JAVA™ language source code developer may want to port existing JAVA™ language code to the .NET™ framework and use the generic classes provided by .NET™. The existing JAVA™ language code may have been written in standard JAVA™ language or in a variation of JAVA™ language such as Visual J#™, Jscript, or J++. Regardless of the original JAVA™ language used, Visual J#.NET™ in the .NET™ framework enables a developer to port the existing JAVA™ language code to the .NET™ framework and use the generic classes of the .NET™ framework.

Generating Executable Code From Source Code Using Generic Classes

Compiling source code that uses generic classes involves generating a compiled project representative of the source code. The compiled project is readily executable by a microprocessor, using a runtime engine. The compiled project may also be portable to various platforms, hardware, etc. A common intermediate language (CIL) can facilitate portability of the compiled project.

Thus, one implementation of portable code 218 includes a common intermediate language (CIL), such as Microsoft® Intermediate Language (MSIL) code. MSIL defines a virtual instruction set. The MSIL is typically translated by the runtime engine 222 into lower-level instructions executable by a microprocessor. The MSIL is portable by virtue of the fact that the runtime engine 222 is microprocessor or platform aware. A particular implementation of the framework 200 includes Visual J#.NET. Visual J#.NET includes an editor for writing and editing source code using JAVA™ language syntax, and a compiler for compiling the JAVA™ language source code into Microsoft® Intermediate Language (MSIL).

FIG. 3 is a block diagram illustrating an exemplary compiler 212 performing operation with respect to project code 208 to generate portable code 220 executable by a runtime engine. The compiler 212 includes a parser 302, lexical analyzer (lexer) 304, common intermediate language (CIL) importer 306, semantic analyzer 308, and code generator 310.

The parser 302 receives the project source code 208 or other input and generates lexemes based on the source code 208. A lexeme is a minimal lexical unit of a computing language, such as a keyword, identifier, literal, punctuation, and the like, that is recognized by the lexer 304. Typically, the stream of characters making up the source program 208 is read by the parser 302, one at a time, and grouped into lexemes, which are passed to the lexer 304.

In one implementation, the parser 302 reads JAVA™ language source code from the project code 208, which includes references to generic classes 314. The parser 302 divides a reference to a generic class into the generic class name, and one or more associated classes, which may be constrained or unconstrained. For example, if 'Queue<X>' is a generic class, a declaration 'Queue<int>' may be divided into lexemes 'Queue' and 'int'.

The lexer 304 analyzes the syntax of the lexemes generated by the parser 302 with respect to a formal computing grammar. The lexer 304 resolves the lexemes into identifiable parts before translation into lower level machine code. The lexer 304 may also check to see that all input has been provided that is necessary. During compilation, the lexer 304 issues an error if the lexemes cannot be resolved to identifiable parts defined in the formal computing grammar.

In one implementation, the output of the lexer 304 is a parse tree 312. The parse tree 312 is a representation of the source code 208 in which types referenced in the project code 208 are separated in preparation for code generation. The parse tree 312 may be a hierarchical, or tree, structure, in which parameters of generic class declarations are listed under the generic class. Nested classes of a generic class reference are presented at lower branches under the generic class. For example, a line of Visual J#.NET™ (a JAVA™ language) source code MyGenericClasses.LookupTable<long, MyGenericClasses.Queue<String>> may be represented in the parse tree 312 as follows:

```
CType => MyGenericClasses.LookupTable
ClassTree =>
    CType => long
    ClassTree => null
    CType => MyGenericClasses.Queue
    ClassTree =>
        CType => String
        ClassTree = null,
``` wherein 'LookupTable' is a generic class, having two parameters, in which the second parameter is unconstrained as to type. In the above example, the second parameter of the 'LookupTable' is 'Queue,' which is a generic class having a nested class of 'String.' The parser interacts with the CIL importer 306 to validate direct references to the generic classes based on metadata that describes the generic classes.

In an exemplary implementation, the lexer 304 constructs variables of type CClass_Type from the project code 208. CClassType is a subclass of Class CType. In this implementation, the parser 302 fills in recursive (i.e., nested) CClass_Types for generic classes. Later, the lexer 304 traverses the tree while validating each CType and obtaining an associated CClass object reference. When the CClass object reference is created, the CIL importer 306 is called, which allots a token to the CClass object. CClass_Type, CClass and CClass_Info objects are kept unique for the duration of the compiler session.

Thus, the CIL importer 306 generates a tokenized parse tree 316 based on the parse tree 312 and generic class definitions in the generic classes 314. The generic classes 314 may be obtained from class libraries (e.g., class libraries 208, FIG. 2) or other compiled projects (e.g., assemblies in .NET™). In the tokenized parse tree 312, the types are represented as tokens that refer to defined types. For example, a constructed class 'Queue<int, string>' may be represented in the parse tree 312 as follows:
TokenCurrent
    Token1
    Token2, wherein "TokenCurrent" is a token associated with generic class 'Queue,' Token1 is a token associated with class 'int', and Token2 is a token associated with class 'string.'

A particular implementation of the CIL importer 306 also generates metadata related to the classes referenced in the project code 208. The CIL importer 306 gathers metadata from class definitions and populates the tokenized parse tree 316 with the metadata.

In a .NET™ implementation of the CIL importer 306, the CIL importer creates Microsoft® Intermediate Language (MSIL) assembly tokens using native .NET™ Metadata Application Programming Interfaces (APIs). The CIL importer 306 uses the CClassType data created by the lexer 304 to construct data of type CClass. CClass variables store ClassInfo, which include metadata descriptive of the class. The CIL importer 306 stores the MSIL assembly tokens in data of type CClassInfo. Every CClass_Type has a field to hold the CClass and vice versa.

```
class CType_List : public std::list<const CType*>
{
...
}
CClass_Type holds a reference to CClass
class CClass_Type : CType
{
...
CType_List *m_pCtypeList;
CClass *pCClass;
...
}
// CClass holds a reference to CClassInfo and a reference
to CClass_Type
class CClass
{
...
CClass_Type *pCClassType;
CClass_Info *pCClass_Info;
...
}
CClass_Info
{
...
unsigned int uAssemlbyToken;
...
}
```

Metadata describes the types and classes in the portable code. Exemplary metadata include: a name of the class; visibility information indicating the visibility of the class; inheritance information indicating a class from which the class derives; interface information indicating one or more interfaces implemented by the class; method information indicating one or more methods implemented by the class; properties information indicating identifying at least one property exposed by the class; and events information indicating at least one event the class provides.

The semantic analyzer 308 performs semantic analysis on the tokenized parse tree 314. Semantic analysis involves traversing the tokenized parse tree 314 and validating types and operations with respect to the generic classes represented in the parse tree. For example, the semantic analyzer 308 validates assignments and casts with 'instanceof checks' to ensure that objects of generic classes are not assigned to an invalid type. If invalid types or operations are identified by the semantic analyzer 308, an error is generated during compile time. If no errors are identified, the semantic analyzer 308 generates a validated tokenized parse tree 318.

The code generator 310 generates the compiled project 214 based on the validated tokenized parse tree 318 and the generic classes 314. Code generator 310 converts the parsed and type checked tokens of the validated tokenized tree 318 into common intermediate language (CIL) code. The code generator 310 traverses the validated tokenized parse tree 318 gathering tokens. When the code generator has enough tokens to create a line of CIL code, the corresponding CIL code is appended to the portable code 216.

The code generator 214 creates the metadata 218 based on metadata in the validated tokenized parse tree 318. The metadata 218 may be stored with the project code 216 so that the compiled project 214 can be easily transported from one platform to another platform. In addition, the metadata 218 can enable another application program and/or developers to use the project code 216.

Although some exemplary methods and systems have been illustrated in the accompanying Drawings and described in the foregoing Detailed Description, it will be understood that the methods and systems are not limited to the exemplary embodiments disclosed, but are capable of numerous rearrangements, modifications and substitutions without departing from the spirit set forth and defined by the following claims.

What is claimed is:

1. A computer-implemented method of generating common intermediate language code for use in a framework, the method comprising:
    Receiving at a computer a portion of JAVA™ language source code referencing, through a generic class syntax, one or more generic classes unspecified in a formal JAVA™ language specification, wherein:
        each of the one or more generic classes refers to a first class configured to operate uniformly on instances of a plurality of types associated with the first class;
        the plurality of types are defined in the first class as an unconstrained type supporting a generic class type;
        at least one of the one or more generic classes nests a second generic class as one of the plurality of types within the first class by associating declaration of instance of the second generic class with a defined first generic class: and
        the generic class syntax is not specified in the formal JAVA™ language specification and identifies one instance of the plurality of types by surrounding the one instance with angular brackets following the first class; and
    generating, through a first compiler different from a formal compiler complying with the formal JAVA™ language specification, language-neutral intermediate language code representing the portion of JAVA™ language source code for execution at the computer and referencing the one or more generic classes.

2. A method as recited in claim 1 further comprising parsing the portion of the JAVA™ language source code into a parse tree representing the portion of the JAVA™ language source code before compiling the portion with the first class.

3. A method as recited in claim 2 further comprising nesting a constructed class of the first class in the parse tree.

4. A method as recited in claim 1 further comprising:
    generating a parse tree having a token referencing the first class and a token referencing the one instance; and
    semantically analyzing the parse tree to determine validity of semantics of the first class.

5. A method as recited in claim 4 wherein the semantically analyzing comprises determining whether operations applied to the first class are valid.

6. A method as recited in claim 1 further comprising generating metadata descriptive of the first class.

7. A method as recited in claim 6 further comprising storing the metadata with the language-neutral intermediate language code, whereby the language-neutral intermediate language code is used by an application program.

8. A method as recited in claim 1 further comprising creating a compiled project including the language-neutral intermediate language code and metadata descriptive of the first class and the one instance.

9. A method as recited in claim 1 further comprising executing the language-neutral intermediate language code with a runtime engine.

10. A method as recited in claim 1 wherein the framework is a .NET™ Framework.

11. A method as recited in claim 10 wherein the developing comprises authoring the portion of JAVA™ language source code with a VISUAL J# .NET™ application of the .NET™ Framework.

12. A method as recited in claim 1 further comprising validating an operation on the instance of the generic class based on the defined generic class.

13. A computer-readable medium having stored thereon computer-executable instructions for performing a method of compiling in a framework, the method comprising:
    receiving a portion of JAVA™ language software including an instruction that references a generic class of a specified type through use of a generic class syntax, wherein:
        the generic class is unspecified in a formal JAVA™ language specification and refers to a first class configured to operate uniformly on instances of a plurality of types associated with the first class;
        the plurality of types are defined in the first class as an unconstrained type supporting a generic class type;
        the generic class nests a second generic class as one of the plurality of types within the generic class by associating declaration of instance of the second generic class with the first class; and
        the generic class syntax is not specified in the formal JAVA™ language specification and identifies one of the instances of the plurality of types by surrounding the one instance with angular brackets following the first class; and
    creating a parse tree having a generic class identifier associated with the generic class and type identifier associated with the specified type; and
    generating, through a first compiler other than a traditional compiler complying with the formal JAVA™ language specification, one or more intermediate language instructions representing the JAVA™ language instruction based on the parse tree.

14. A computer-readable medium as recited in claim 13, wherein the method further comprises translating the one or more intermediate language instructions into microprocessor-specific binary for execution by a computer.

15. A computer-readable medium as recited in claim 13, wherein the method further comprises validating the parse tree according to a generic class definition associated with the generic class.

16. A computer-readable medium as recited in claim 15, wherein validating the parse tree comprises determining whether an assignment applied to the instance of the generic class assigns an allowable type to the instance.

17. A computer-readable medium as recited in claim 13, wherein the method further comprises generating metadata associated with the generic class.

18. A computer-readable medium as recited in claim 13, wherein the method further comprises nesting the second generic class and the second specified type at different levels in a hierarchy in the parse tree.

19. A computer-readable medium as recited in claim 13, wherein the plurality of types comprises one of:
   an integer type;
   a float type;
   a Stack type;
   a Queue type; and
   a Dictionary type.

20. A computer-implemented method of generating microprocessor-executable code in a framework, the method comprising:
   receiving at a computer a portion of source code written in a first programming language for which generic classes are unspecified, the portion of source code including a generic class declaration declaring a generic class, wherein:
      the generic class refers to a first class configured to operate uniformly on values of different types associated with the first class and defined by a plurality of second classes;
      the plurality of second class are defined in the first class as an unconstrained type supporting a generic class type;
      the generic class nests a second generic class as one of the plurality of second classes within the generic class by associating declaration of instance of the second generic class with the first class;
      the generic class uses a generic class syntax not specified in a formal specification of the first programming language;
      the generic class declaration creates a constructed class of the generic class by associating a reference of one of the plurality of second classes with the generic class; and
   generating a module having microprocessor-executable instructions corresponding to the constructed class based on the portion of source code, the module further having metadata describing the constructed class.

21. The method as recited in claim 20 further comprising:
   parsing the portion of source code into a parse tree comprising each instance of the one or more generic types in the portion of source code, wherein each instance of the one or more generic types comprises:
      the first type; and
      at least one instance of one of the plurality of second types associated with the first type.

22. The method as recited in claim 21 further comprising tokenizing the parse tree with a token corresponding to the one or more generic types.

23. The method as recited in claim 22 further comprising tokenizing the parse tree with at least one token corresponding to the at least on instance of one of the plurality of second types associated with the first type 24. The method as recited in claim 20 wherein each of the one or more generic types is a .NET™ generic class.

25. A method as recited in claim 20 wherein the microprocessor-executable instructions comprise intermediate language instructions.

26. A method as recited in claim 20 wherein the microprocessor-executable instructions comprise Microsoft® Intermediate Language instructions.

27. A method as recited in 20 wherein the metadata comprises at least one of:
   a name of the constructed class;
   visibility information indicating the visibility of the constructed class;
   inheritance information indicating a class from which the constructed class derives;
   interface information indicating one or more interfaces implemented by the constructed class;
   method information indicating one or more methods implemented by the constructed class;
   properties information indicating identifying at least one property exposed by the constructed class; and
   events information indicating at least one event the constructed class provides.

28. A system for compiling in a framework, the system comprising;
   one or more processors; and;
   a parser receiving JAVA™ language source code having an instruction referencing a generic class in a generic class syntax and specifying a type of the generic class, the parser further creating a parse tree from the JAVA™ language source code, the parse tree including a first node representing the generic class and a second node representing the specified type of the generic class, wherein:
      the generic class refers to a first class configured to operate uniformly on values of different types associated with the first class and defined by a plurality of second classes;
      the plurality of second classes are defined in the first class as an unconstrained type supporting a generic class type;
      the generic class nests a second generic class as one of the plurality of second classes within the generic class by associating declaration of instance of the second generic class with the first class;
      the generic class syntax is unspecified in the formal language specification of JAVA™ programming language and supported in the framework; and
   a code generator generating intermediate language code representing the JAVA™ language source code referencing the generic classes.

29. A system as recited in claim 28, further comprising a validator configured to validate type of the first class based on a definition of the first class.

30. A system as recited in claim 29, wherein the validator validates an operation on the first class based on a definition of the first class.

31. A system as recited in claim 28, wherein the first class is a Queue class.

32. A system as recited in claim 28 further comprising:
   a common intermediate language importer providing tokens associated with the generic class and the specified type of the generic class.

33. A system as recited in claim 28 further comprising a runtime engine executing the intermediate language code.

34. A system as recited in claim 28 further comprising a semantic analyzer analyzing the specified type to determine whether the specified type is an allowable type of the generic class.

* * * * *